(12) United States Patent
Tabata et al.

(10) Patent No.: US 9,077,826 B2
(45) Date of Patent: Jul. 7, 2015

(54) DATA PRINTING SYSTEM, PORTABLE TERMINAL DEVICE AND COMPUTER-READABLE MEDIUM

(71) Applicant: CASIO COMPUTER CO., LTD., Tokyo (JP)

(72) Inventors: Shinichirou Tabata, Higashiyamato (JP); Ryo Oe, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 13/851,930

(22) Filed: Mar. 27, 2013

(65) Prior Publication Data

US 2013/0258404 A1    Oct. 3, 2013

(30) Foreign Application Priority Data

Mar. 29, 2012  (JP) ................................. 2012-075566

(51) Int. Cl.
*G06F 3/12* (2006.01)
*H04N 1/00* (2006.01)

(52) U.S. Cl.
CPC .... *H04N 1/00281* (2013.01); *H04N 2201/0074* (2013.01); *H04N 1/00204* (2013.01); *H04N 2201/0055* (2013.01); *H04N 2201/0094* (2013.01)

(58) Field of Classification Search
None
See application file for complete search history.

(56) References Cited

U.S. PATENT DOCUMENTS

| 2007/0136154 A1* | 6/2007 | Chung ........................... 705/29 |
| 2008/0278437 A1* | 11/2008 | Barrus et al. .................. 345/156 |
| 2010/0238495 A1* | 9/2010 | Sugimoto .................... 358/1.15 |
| 2011/0222943 A1* | 9/2011 | Tanaka .......................... 399/391 |
| 2012/0019858 A1 | 1/2012 | Sato |
| 2012/0250082 A1* | 10/2012 | Mori ............................ 358/1.15 |

FOREIGN PATENT DOCUMENTS

| CN | 102348029 A | 2/2012 |
| JP | 2003-24191 A | 8/2003 |

OTHER PUBLICATIONS

Chinese Office Action dated Feb. 11, 2015, issued in counterpart Chinese Application No. 201310206714.3.

* cited by examiner

*Primary Examiner* — Vincent Rudolph
*Assistant Examiner* — John Wallace
(74) *Attorney, Agent, or Firm* — Holtz, Holtz, Goodman & Chick PC

(57) ABSTRACT

The present invention allows desired printing to be easily achieved not with complex operation but with intuitive operation. In the present invention, short-range communications can be made between a portable terminal device and a copy machine. When the portable terminal device is placed on a placement table of the copy machine, the copy machine detects the placement state of the portable terminal device (for example, landscape orientation or portrait orientation), determines a print format (for example, printing in a vertical direction or a horizontal direction as a printing direction) according to this placement state, and performs printing of print data received from the portable terminal device according to the print format.

9 Claims, 15 Drawing Sheets

FIG. 11

FT FORMAT TABLE

| PLACEMENT STATE | PRINTING DIRECTION | PAPER SIZE |
|---|---|---|
| PORTRAIT LEFTWARD ORIENTATION | VERTICAL DIRECTION | B5/E |
| PORTRAIT CENTER ORIENTATION | VERTICAL DIRECTION | A4/L |
| PORTRAIT RIGHTWARD ORIENTATION | VERTICAL DIRECTION | B4/LL |
| LANDSCAPE UPWARD ORIENTATION | HORIZONTAL DIRECTION | B5/E |
| LANDSCAPE CENTER ORIENTATION | HORIZONTAL DIRECTION | A4/L |
| LANDSCAPE DOWNWARD ORIENTATION | HORIZONTAL DIRECTION | B4/LL |

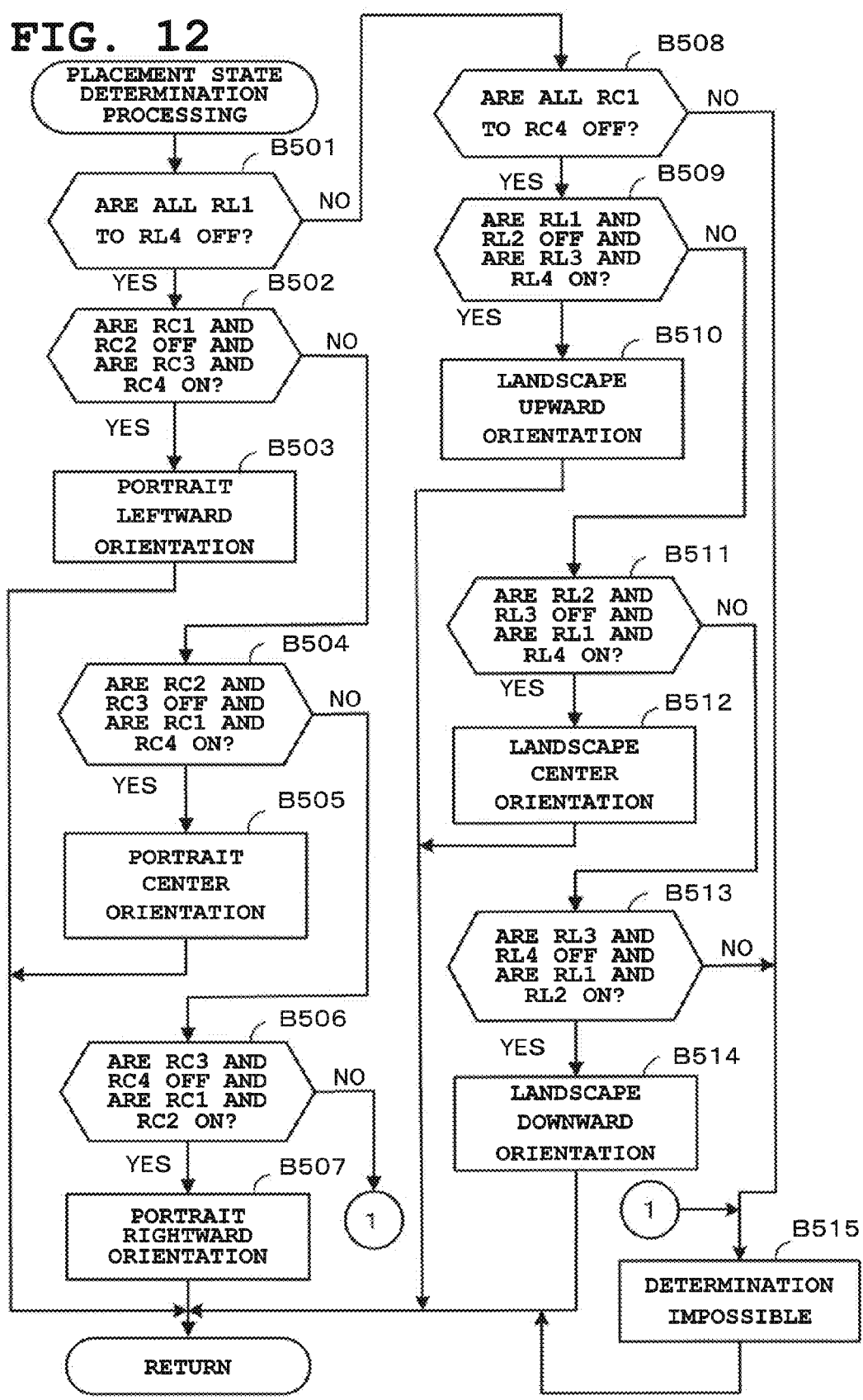

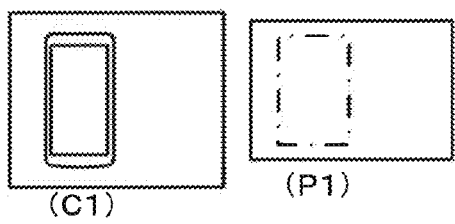
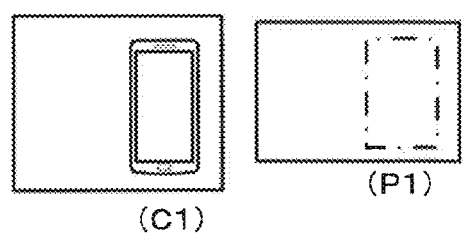
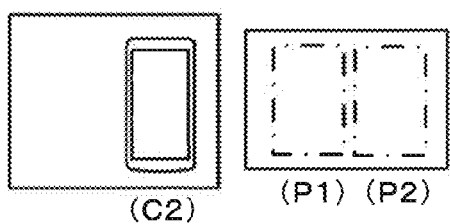
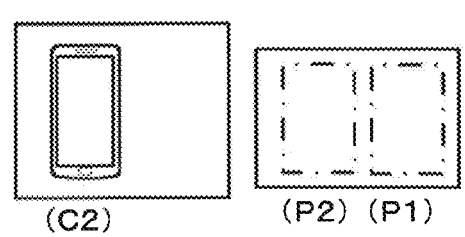
FIG. 14A     FIG. 14B
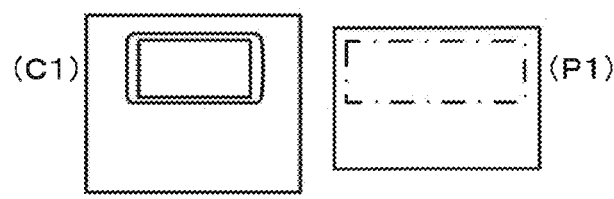
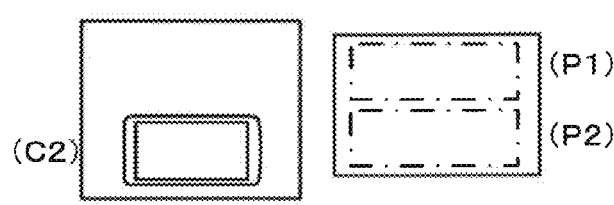
FIG. 14C
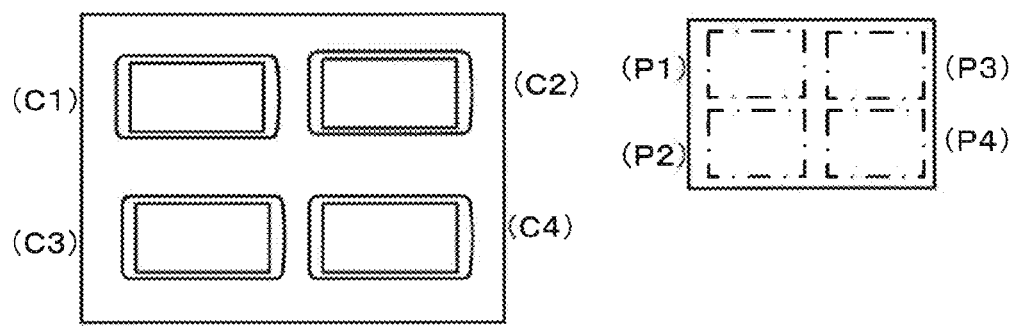
FIG. 14D

DATA PRINTING SYSTEM, PORTABLE TERMINAL DEVICE AND COMPUTER-READABLE MEDIUM

CROSS-REFERENCE TO RELATED APPLICATION

This application is based upon and claims the benefit of priority from the prior Japanese Patent Application No. 2012-075566, filed Mar. 29, 2012, the entire contents of which is incorporated herein by reference.

BACKGROUND OF THE INVENTION

1. Field of the Invention

The present invention relates to a data printing system including a printing device for receiving and printing print data and a portable terminal device for transmitting the print data to the printing device, the portable terminal device, and a computer readable medium.

2. Description of the Related Art

In general, multifunction printing devices (copy machines) set in convenience stores or the like have become increasingly available, with a color copy function, a facsimile function, an enlarged printing function and other functions converging into the devices for multifunctionality. However, users have to bring a document as a copy target, operate a key on the copy machine, set a print format, and then issue an instruction for print start. Also, a technology has been conventionally suggested such that print target data stored in a portable terminal such as a portable phone is transmitted to the copy machine, with the portable terminal and the copy machine being connected via a cable (refer to Japanese Patent Application Laid-Open (Kokai) Publication No. 2003-241911).

SUMMARY OF THE INVENTION

However, even in the technology described above, as is the case of bringing a document as a print target, cumbersome operations have to be performed to set a print format. However, users unfamiliar to these operations do not know which operations to be performed in which order, being puzzled by the operations and making errors in the settings to cause trouble to other users waiting for copying.

The present invention is to easily achieve desired printing not with complex operation but with intuitive operation.

In accordance with one aspect of the present invention, there is provided a data printing system including a printing device for receiving and printing print data and a portable terminal device for transmitting the print data to the printing device, comprising: a state identifying section which identifies a placement state of the portable terminal device; a determining section which determines print control information according to the placement state identified by the state identifying section; a receiving section which receives print data from the portable terminal device; and a printing section which prints the print data according to the print control information determined by the determining section.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 11 is a diagram of a format table FT for describing a second embodiment;

FIG. 12 is a flowchart for describing placement state determination processing (Step B5 of FIG. 6) in detail in the second embodiment;

FIG. 14A to FIG. 14D are diagrams for describing other application examples of the second embodiment;

DETAILED DESCRIPTION OF THE PREFERRED EMBODIMENTS

Embodiments of the present invention are described in detail below with reference to the drawings.

First Embodiment

First, a first embodiment of the present invention is described with reference to FIG. 1 to FIG. 9B.

Figure 1:
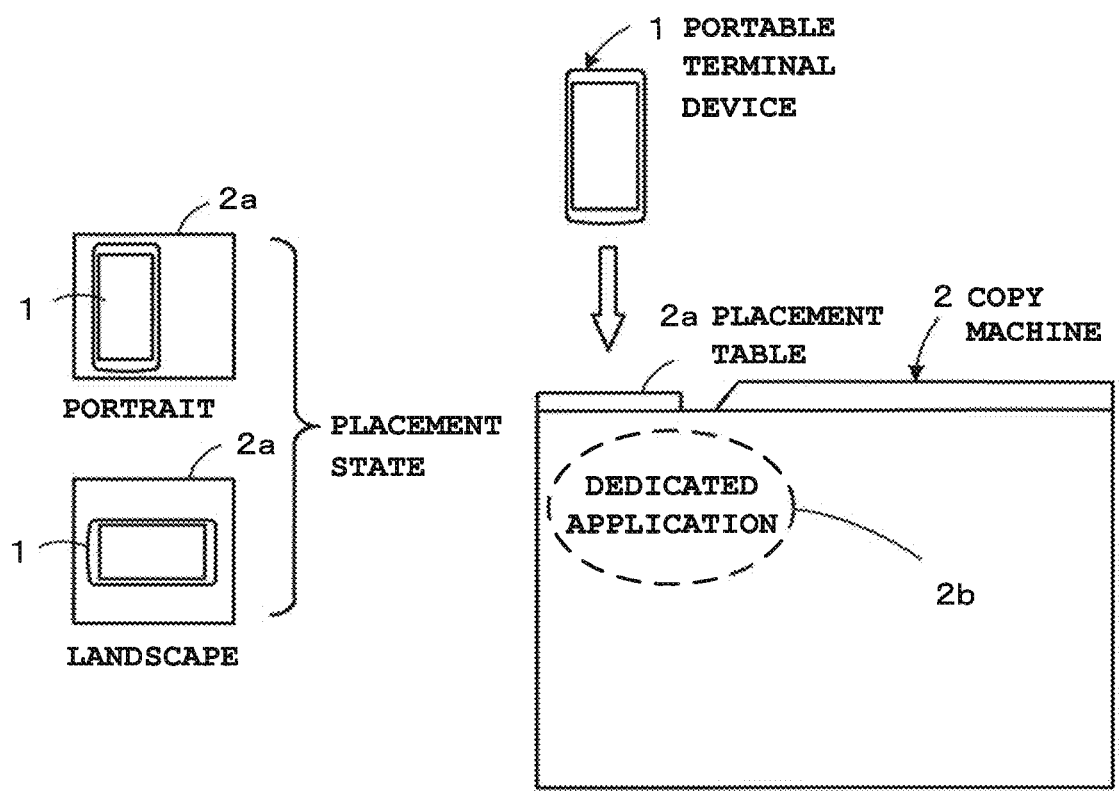
FIG. 1 is a diagram for describing a data printing system including a printing device for receiving and printing print data and a portable terminal device for transmitting the print data to the printing device.

FIG. 1 is a diagram for describing a data printing system including a printing device for receiving and printing print data and a portable terminal device for transmitting the print data to the printing device.

In this data printing system, data transmission and reception can be performed between a portable terminal device 1 and a printing device (copy machine) 2 via short-range communication. The portable terminal device 1 is, for example, a multi-functional portable phone called a smartphone. The portable terminal device 1 includes basic functions such as a calling function, an electronic mail function, and an Internet connection function, as well as a copy function and a short-range communication function to be used with the printing device (copy machine) 2. The copy function is a function for causing print data arbitrarily selected as a print target with a user operation to be printed and outputted by transmitting the print data to the printing device (copy machine) 2 via the short-range communication function.

The copy machine 2 is a multifunction printing device placed in a convenience store, at school, or other places and having a color copy function, a facsimile function, an enlarged printing function, and other functions converging thereinto. On an upper surface part of the copy machine 2, a placement surface (placement table) 2a where the portable terminal device 1 is placed is provided. With the portable terminal device 1 placed on this placement table 2a, print data received from the portable terminal device 1 is printed. Here, when identifying that the portable terminal device 1 is placed on the placement table 2a, the copy machine 2 receives and obtains print data from the portable terminal device 1 for printing.

A dedicated application 2b detects a placement state in which the portable terminal device 1 is placed and determines print control information (in the present embodiment, a print format) according to the placement state. The dedicated application 2b is a print function dedicated to the portable terminal for controlling a series of operations of printing the print data received and obtained from the portable terminal device 1 according to the print control information (print format). That is, when the portable terminal device 1 is placed on the placement table 2a, the copy machine 2 starts the dedicated application 2b. Then, a placement state of the portable terminal device 1 (for example, portrait orientation or landscape orientation, which will be described further below) is detected and, according to this placement state, a print format (for example, printing in a vertical direction or a horizontal direction as a printing direction) is determined. Then, the print data received from the portable terminal device 1 is printed according to the print format.

Figure 2:
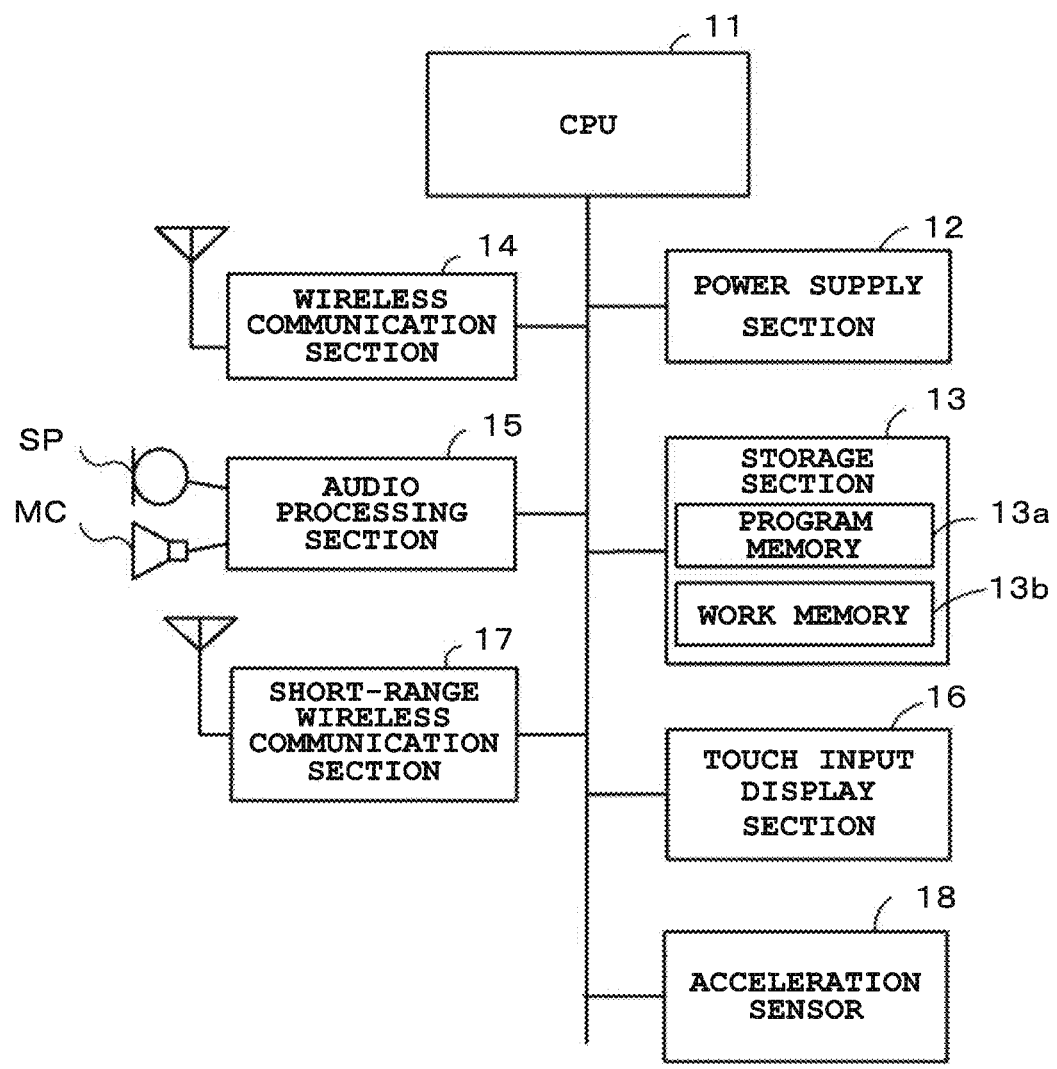
FIG. 2 is a block diagram depicting basic components of a portable terminal device 1.

FIG. 2 is a block diagram depicting basic components of the portable terminal device 1.

A CPU 11 is a central computation processing device that operates with power supply from a power supply section 12 including a secondary battery (omitted in the drawing) and controls the entire operation of this portable terminal device 1 according to various programs in a storage section 13. The storage section 13 is provided also with a program memory 13a, a work memory 13b, etc. The program memory 13a has stored therein programs and various applications for achieving the present embodiment according to an operation procedure depicted in FIG. 5 and has also stored therein information required for this achievement.

The work memory 13b in the storage section 13 is a work area in which various information (for example, a flag, a timer, etc.) required for causing the portable terminal device 1 to operate is temporarily stored. Note that the storage section 13 may be configured to include a removable and transportable memory (recording medium) such as an SD (Secure Digital) card or an IC (Integrated Circuit) card, and may partially include an area of a predetermined external server not shown in the drawing. A wireless communication section 14 is a wide-range communication section for use in the voice calling function, the electronic mail function, and the Internet connection function. The wireless communication section 14 causes voice to be outputted from a loudspeaker SP for calling via an audio processing section 15 at the time of operation of the calling function. Also, input audio data from a microphone MC for calling is taken from the audio processing section 15 and transmitted from an antenna for output.

A touch input display section 16 is a device configured to include a display panel and a touch panel, having software keys (touch keys) assigned and arranged thereon and displaying their functional names, and sensing a touch operation with a finger or the like and inputting data according to the touch operation. This touch input display section 16 is provided with, for example, a mode key (omitted in the drawing) for transmitting print data via the short-range communication function to the copy machine 2 for switching to an operation mode for printing (a print mode) and a print start key (omitted in the drawing) for issuing an instruction for print start to the copy machine 2 in the state as being switched to this print mode. A short-range wireless communication section 17 can perform high-speed, large-capacity communications. For example, a contactless IC card or a wireless LAN (Local Area Network) module is used, and text data, image data, or the like is taken as print data for transmission to the copy machine 2. An acceleration sensor 18 configures a vibration detecting section of a pedometer function or configures an orientation detection section that detects the orientation of a housing (main body) of the portable terminal device 1, and details will be described in the following.

Figure 3:
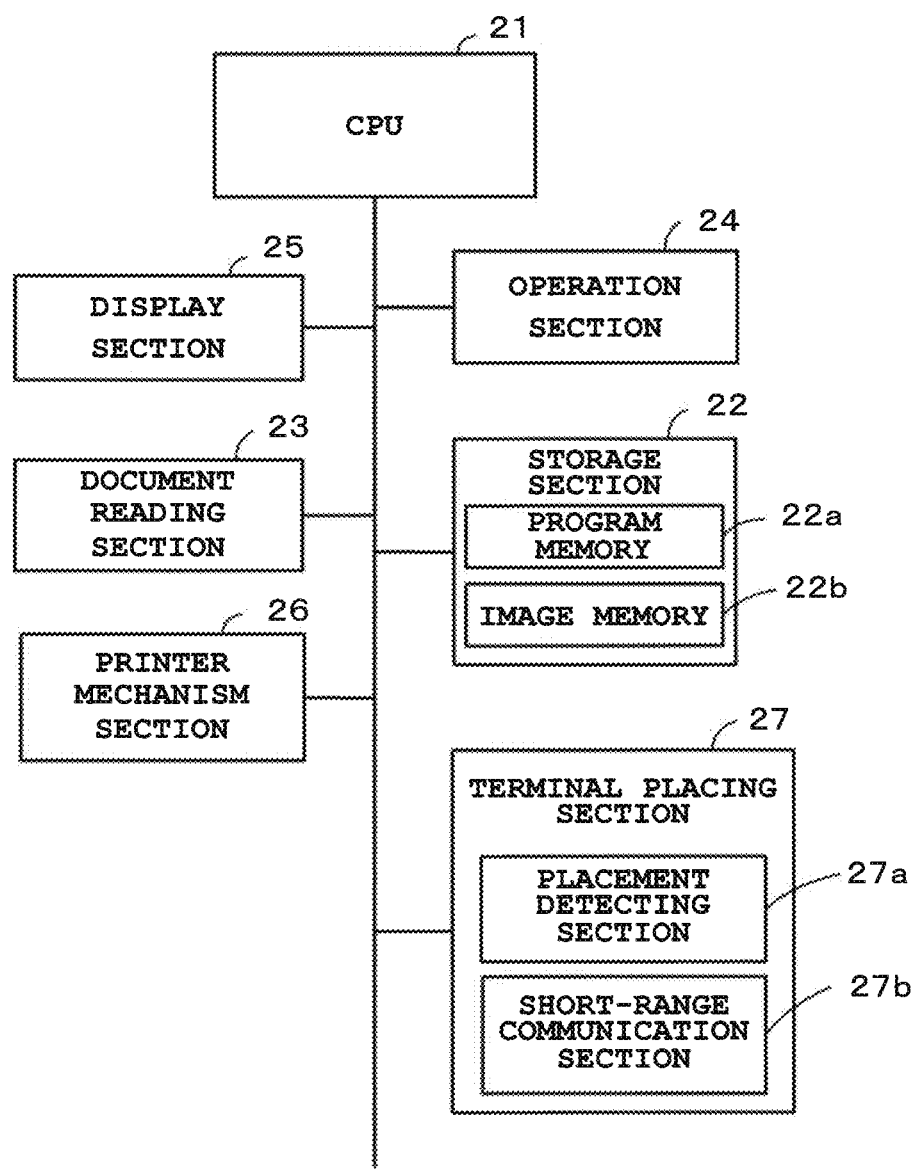
FIG. 3 is a block diagram depicting basic components of a printing device (copy machine) 2.

FIG. 3 is a block diagram depicting basic components of the copy machine 2.

A CPU (Central Processing Unit) 21 is a central computation processing device that operates with power supply from an AC power supply section (omitted in the drawing) and controls the entire operation of this copy machine 2 according to various programs in a storage section 22. The storage section 22 is provided with a program memory 22a, an image memory 22b, etc. The program memory 22a has stored therein programs and various applications for achieving the present embodiment according to operation procedures depicted in FIG. 6 to FIG. 8 and has also stored therein information required for this achievement. The image memory 22b is a memory temporality storing an image (image data) of a document read by a document reading section 23. Note that the storage section 22 may be configured to include a removable and transportable memory (recording medium) such as an SD card or an IC card, and may partially include an area of a predetermined external server not shown in the drawing.

An operation section 24 has, although omitted in the drawing, a key for issuing an instruction for print start, a key for specifying various print formats, etc. The CPU 21 performs print control according to an operation signal inputted from the operation section 24. That is, the CPU 21 causes a print format inputted from the operation section 24 to be displayed on a display section 25 for user confirmation. The CPU 21 sends an image (image data) of the document stored in the image memory 22b to a printer mechanism section 26. The CPU 21 causes image data to be printed for output according to the print format arbitrarily inputted and specified from the operation section 24. The printer mechanism section 26 has trays (omitted in the drawing) for feeding a plurality of paper sheets of different sizes.

A terminal placing section 27 is configured to have the placement table 2a described above as well as a placement detecting section 27a and a short-range wireless communication section 27b. The placement detecting section 27a optically detects a placement state of the portable terminal device 1 placed on the placement table 2a. The CPU 21 determines a print format according to the placement state of the portable terminal device 1 detected by this placement detecting section 27a. The short-range wireless communication section 27b is a wireless communication section corresponding to the short-range wireless communication section 17 provided on the portable terminal device 1, performing short-distance communication with the portable terminal device 1.

Figure 4A:
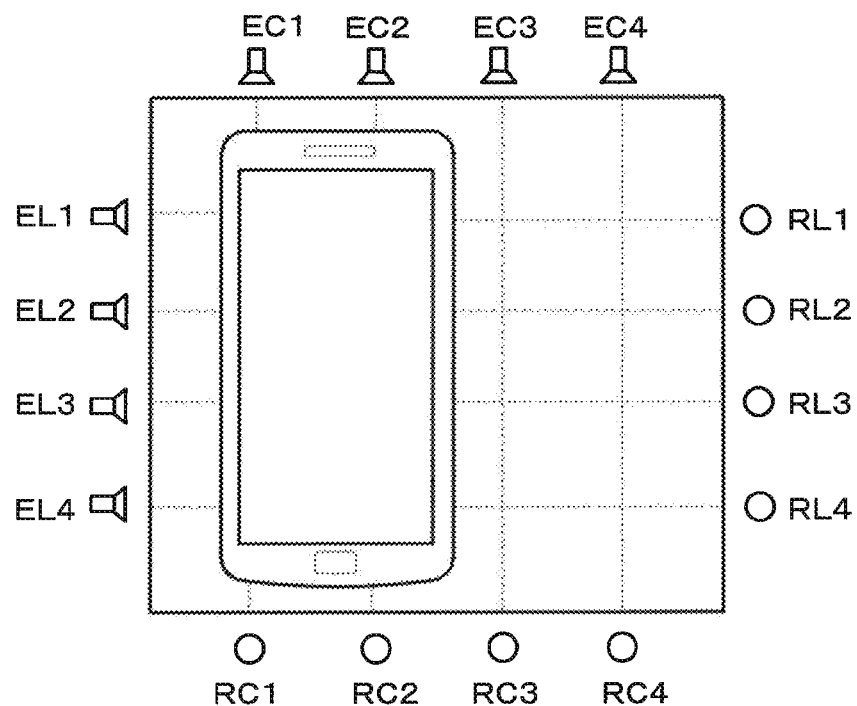
FIG. 4A and FIG. 4B are diagrams for describing the structure of a placement detecting section 27a of the copy machine 2.
Figure 4B:
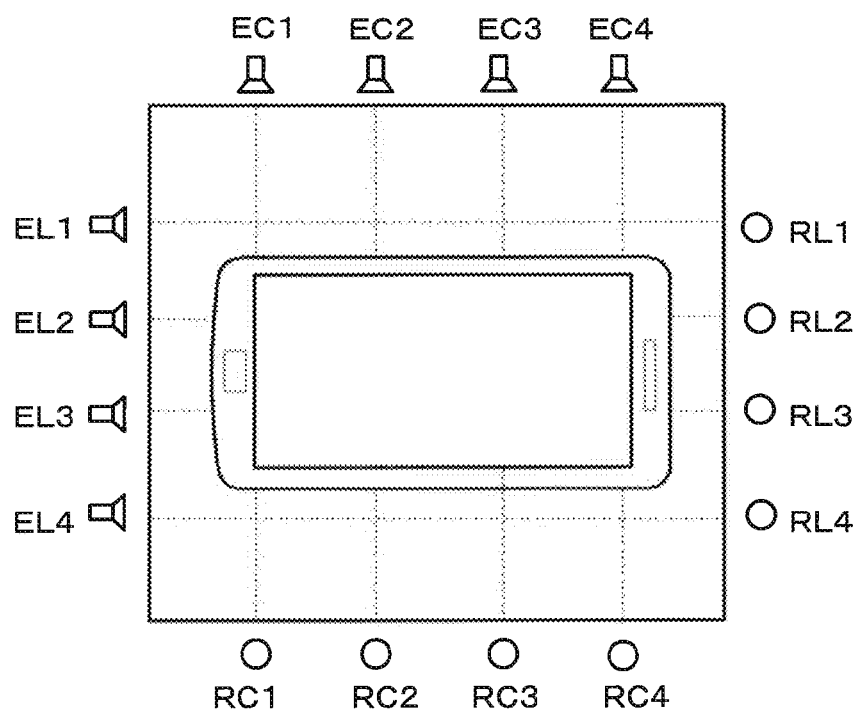

FIG. 4A and FIG. 4B are diagrams for describing the structure of the placement detecting section 27a of the copy machine 2.

The placement detecting section 27a is configured, for example, to have light-emitting sections EL1 to EL4 and EC1 to EC4 that emit infrared rays and light-receiving sections RL1 to RL4 and RC1 to RC4 receiving these rays placed around the rectangular (oblong) placement table 2a. That is, the light-emitting sections EL1 to EL4 are equidistantly placed in a line on one side of the oblong placement table 2a in a vertical direction (short-side direction). Also, the light-emitting sections EC1 to EC4 are equidistantly placed in a line on one side of the placement table 2a in a horizontal direction (long-side direction). Furthermore, the light-receiving sections RL1 to RL4 are equidistantly placed in a line on the other side of the placement table 2a in the vertical direction (short-side direction) so as to face the light-emitting sections EL1 to EL4. Still further, the light-receiving sections RC1 to RC4 are equidistantly placed in a line on the other side of the placement table 2a in the horizontal direction (long-side direction).

The entire main body (housing) of the portable terminal device 1 is formed in the shape of a thin plate-like rectangular parallelepiped. When the portable terminal device 1 is placed on the placement table 2a of the copy machine 2 so that the main body (housing) of the device is vertically oriented, the state is referred to as in "portrait orientation". When the portable terminal device 1 is placed so that the main body of the device is horizontally oriented, the state is referred to as in "landscape orientation". FIG. 4A depicts the case in which the portable terminal device 1 is placed on the placement table 2a in portrait orientation. FIG. 4B depicts the case in which the portable terminal device 1 is placed in landscape orientation. As such, according to whether the portable terminal device 1 is placed in portrait orientation or landscape orientation, ON/OFF states of the light-receiving sections RL1 to RL4 and RC1 to RC4 are changed.

That is, the light-receiving sections RL1 to RL4 placed in the vertical direction (short-side direction) of the placement table 2a are turned to an ON state, in which an output signal is at a high level, when receiving rays from the corresponding light-emitting sections EL1 to EL4, and are turned to an OFF state, in which an output signal is at a low level, when rays are interrupted by the portable terminal device 1. Similarly, the light-receiving sections RC1 to RC4 placed in the horizontal direction (long-side direction) of the placement table 2a are turned to an ON state, in which an output signal is at a high level, when receiving rays from the corresponding light-emitting sections EC1 to EC4, and are turned to an OFF state, in which an output signal is at a low level, when rays are interrupted by the portable terminal device 1.

Next, an operational concept of the portable terminal device 1 and the copy machine 2 in the first embodiment is described with reference to flowcharts depicted in FIG. 5 to FIG. 8. Here, each function described in these flowcharts is stored in the form of readable program code, and operations according to the program code are sequentially performed. Also, operations according to the program code transmitted via a transmission medium such as a network can be sequentially performed. The same goes for other embodiments, which will be described further below. An operation unique to the present embodiment can be performed by using a program/data externally supplied via not only a recording medium but also a transmission medium.

Figure 5:
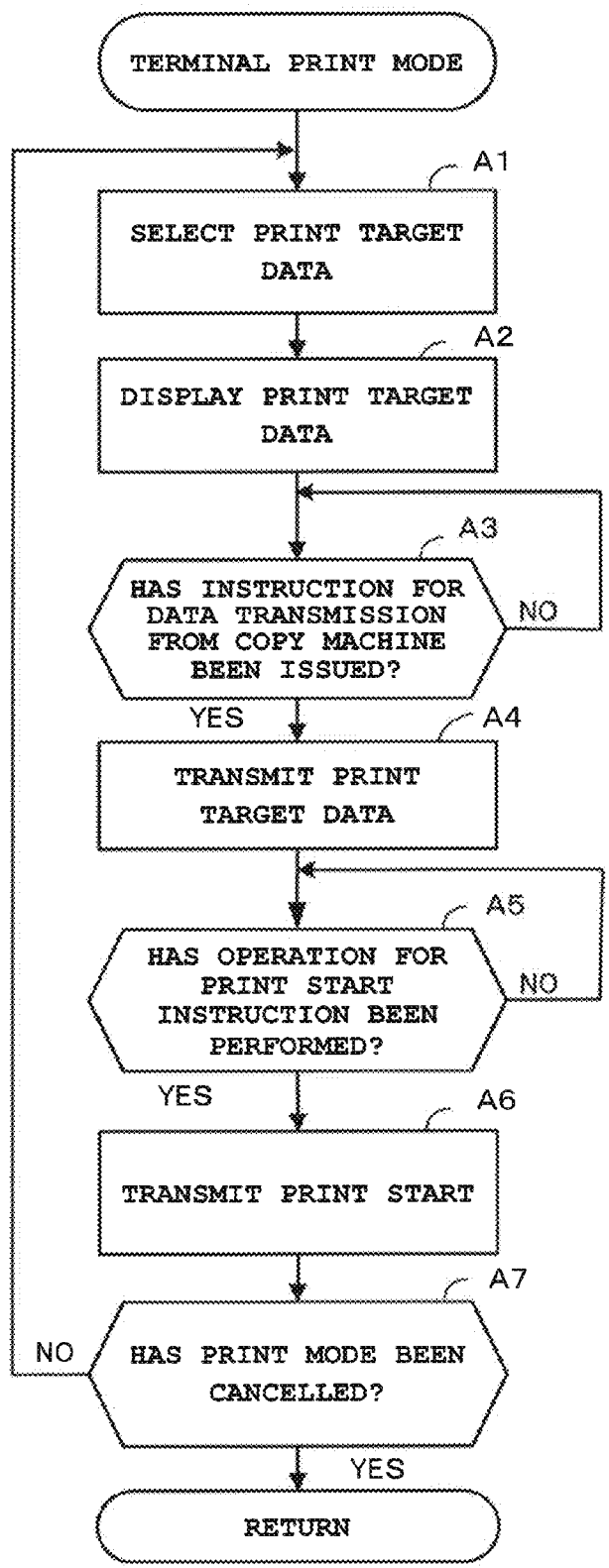
FIG. 5 is a flowchart outlining the operation of a characteristic portion of a first embodiment that is started at the time of switching to a print mode from among all of the operations of the portable terminal device 1.

FIG. 5 is a flowchart outlining the operation of a characteristic portion of the first embodiment that is started at the time of switching to a print mode from among all of the operations of the portable terminal device 1. After exiting the flow in this FIG. 5, the process returns to the main flow (omitted in the drawing) of the entire operation. Here, for example, when using the copy machine 2 in a convenience store or other places, a user operates the mode key described above to switch to a print mode. In the state switched to the print mode, after an operation of displaying a data list screen is performed, an operation of selecting any data from the list screen as print target data is performed.

The CPU 11 of the portable terminal device 1 causes an operation of selecting any data from the data list screen (Step A1). The data is displayed on the entire screen of the touch input display section 16 (Step A2). Here, the user confirming the print target data (print data) places the portable terminal device 1 on the placement table 2a of the copy machine 2 in consideration of the orientation of placement according to desired printing. Upon detection of the placement of the portable terminal device 1, the copy machine 2 requests the portable terminal device 1 to transmit the print data.

Upon receiving a data transmission request from the copy machine 2 (YES at Step A3), the portable terminal device 1 performs processing for transmitting the print data displayed on the touch input display section 16 to the copy machine 2 (Step A4). Then, the portable terminal device 1 waits for an operation for instruction of print start (Step A5). Here, the portable terminal device 1 performs an operation for making an instruction for print start (YES at Step A5). The portable terminal device 1 transmits an instruction for print start to the copy machine 2 (Step A6). Then, the portable terminal device 1 judges whether an operation of cancelling the print mode has been performed (Step A7). The process returns to Step A1 described above (NO at Step A7) until the print mode is canceled. In this case, when next data is selected as a print target, the operation described above is repeated.

Figure 6:
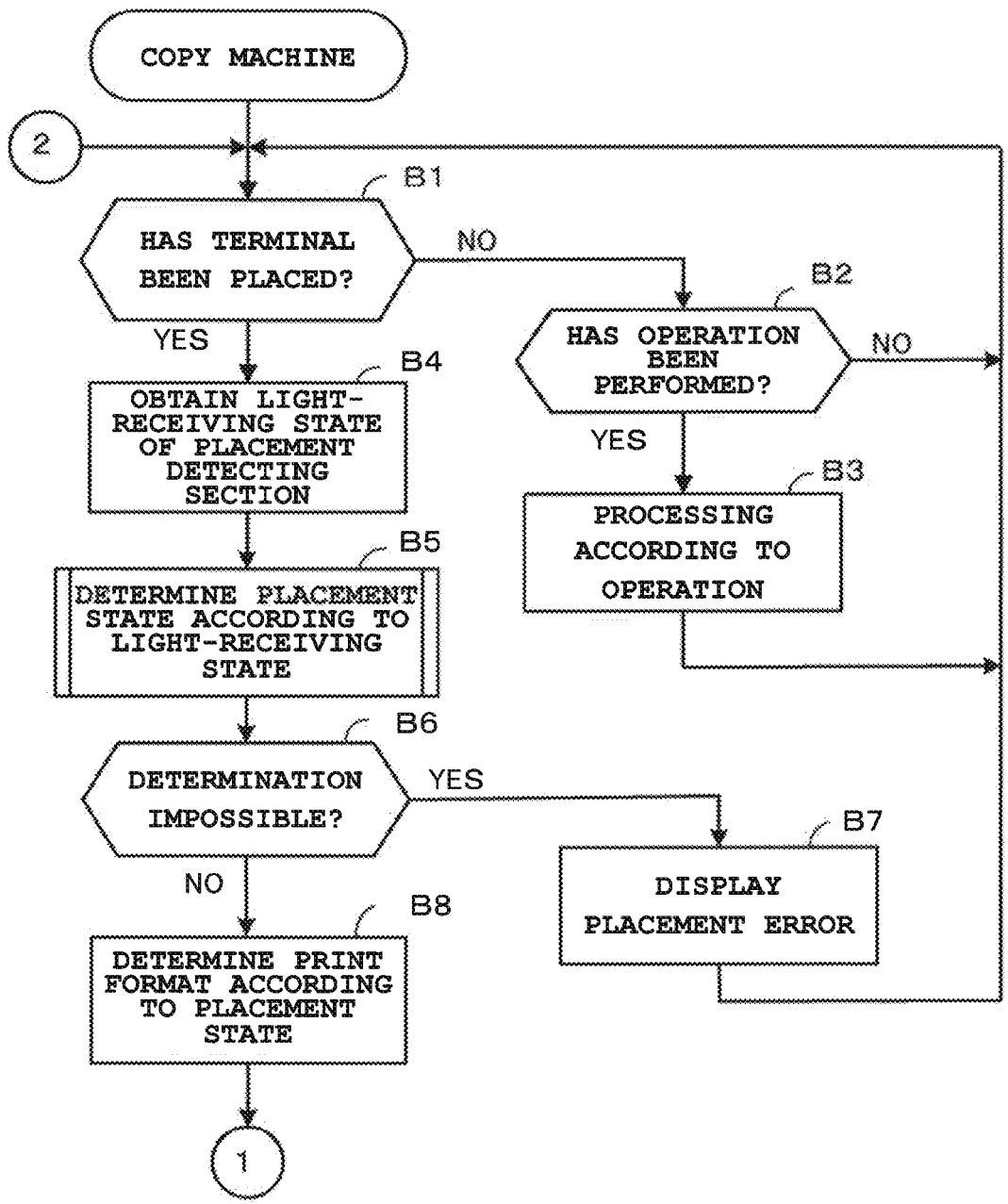
FIG. 6 is a flowchart outlining the entire operation of the copy machine 2.
Figure 7:
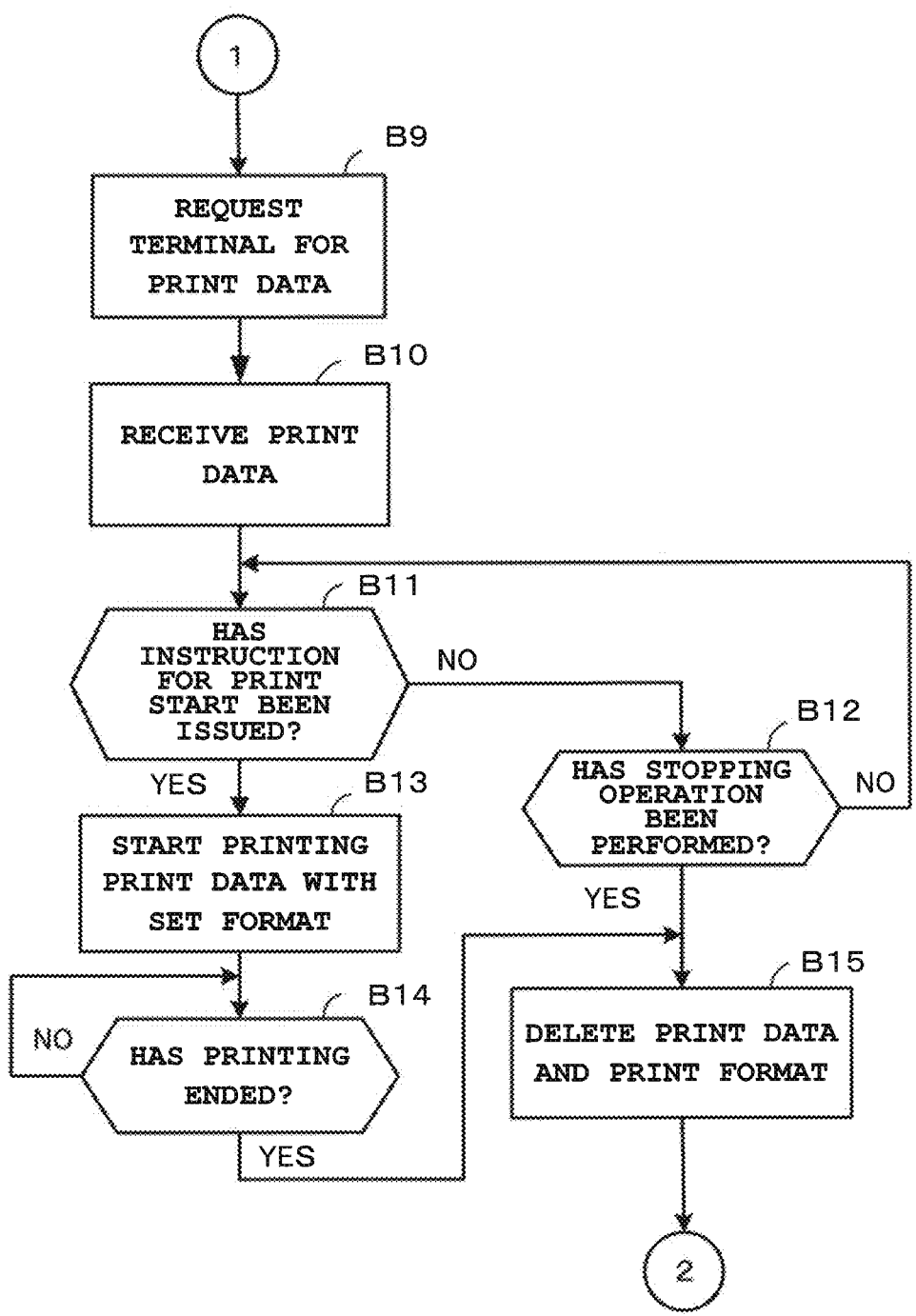
FIG. 7 is a flowchart continued from the operation of FIG. 6.

FIG. 6 and FIG. 7 are flowcharts outlining the entire operation of the copy machine 2.

First, the CPU 21 of the copy machine 2 judges whether the portable terminal device 1 has been placed on the terminal placing section 27 (Step B1 of FIG. 6). Then, the CPU 21 judges whether any operation has been performed on the operation section 24 (Step B2). In this case, an identification as to whether the portable terminal device 1 is placed on the terminal placing section 27 is made based on whether at least any one of the light-receiving sections RL1 to RL4 and RC1 to RC4 configuring the placement detecting section 27a is in an "ON" state.

If any operation has been performed (YES at Step B2), the CPU 21 performs processing corresponding to the operation (Step B3). For example, when an operation for making an instruction for print start is performed after a print format is inputted from the operation section 24 (YES at Step B2), an image (image data) of a document read by the document reading section 23 is temporarily stored in the image memory 22b, and then the image data is printed and outputted from the printer mechanism section 26 according to the inputted print format (Step B3). On the other hand, if it is detected that the portable terminal device 1 is placed on the terminal placing section 27 (YES at Step B1), the light-receiving state (the detection result) of the placement detecting section 27a is obtained (Step B4), and the process proceeds to processing for determining a placement state of the portable terminal device 1 according to the light-receiving state (Step B5).

Figure 8:
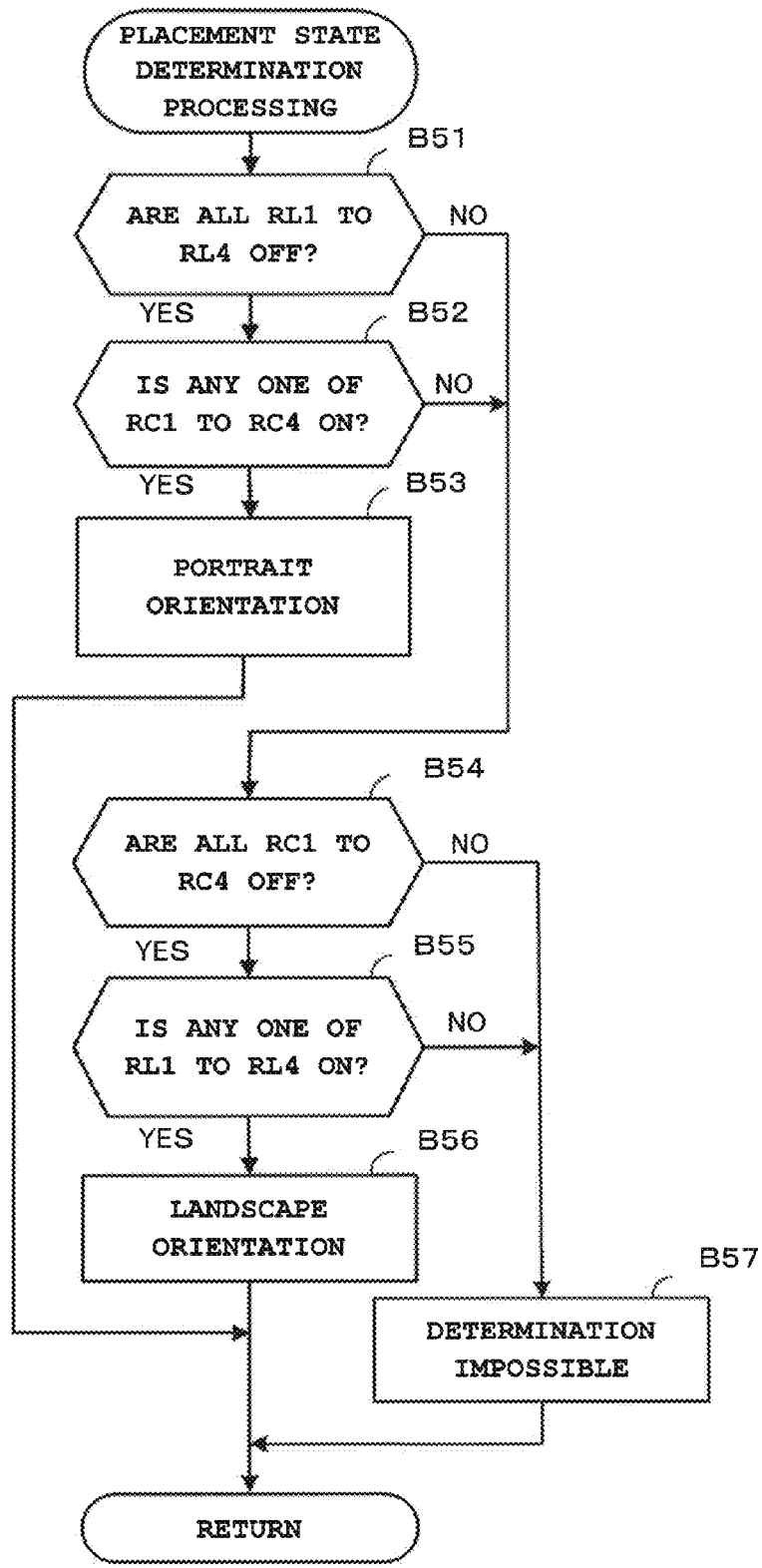
FIG. 8 is a flowchart for describing processing for determining a placement state of the portable terminal device 1 (Step B5 of FIG. 6) in detail.

FIG. 8 is a flowchart for describing the processing for determining a placement state of the portable terminal device 1 (Step B5 of FIG. 6) in detail.

First, the CPU 21 of the copy machine 2 judges whether all of the light-receiving sections RL1 to RL4 configuring the placement detecting section 27a are in an "OFF" state (Step B51). When all of the light-receiving sections RL1 to RL4 are in an "OFF" state and rays from the corresponding light-emitting sections EL1 to EL4 are all interrupted by the portable terminal device 1 (YES at Step B51), the CPU 21 proceeds to Step B52, and judges whether at least any one of the light-receiving sections RC1 to RC4 is in an "ON" state.

Here, when all of the light-receiving sections RL1 to RL4 are not in an "OFF" state (NO at Step B51) or none of the light-receiving sections RC1 to RC4 is in an "ON" state (NO at Step B52), the CPU 21 proceeds to the next Step B54. However, when all of the light-receiving sections RL1 to RL4 are in an "OFF" state (YES at Step B51) and at least any one of the light-receiving sections RC1 to RC4 is in an "ON" state (YES at Step B52), the portable terminal device 1 is determined to have been placed in portrait orientation as depicted in FIG. 4A (Step B53).

On the other hand, if the state is not in portrait orientation (NO at Step B51 or NO at Step B52), the CPU 21 judges whether all of the light-receiving sections RC1 to RC4 are in an "OFF" state (Step B54). Here, when all of the light-receiving sections RC1 to RC4 are in an "OFF" state and rays from the corresponding light-emitting sections EC1 to EC4 are all interrupted by the portable terminal device 1 (YES at Step B54), the CPU 21 judges whether at least one of the light-receiving sections RL1 to RL4 is in an "ON" state (Step B55). Here, when all of the light-receiving sections RC1 to RC4 are not in an "OFF" state (NO at Step B54) or none of the light-receiving sections RL1 to RL4 is in an "ON" state (NO at Step B55), determination of the placement state is impossible (Step B57). On the other hand, when all of the light-receiving sections RC1 to RC4 are in an "OFF" state (YES at Step B54) and at least any one of the light-receiving sections RL1 to RL4 is in an "ON" state (YES at Step B55), the portable terminal device 1 is determined to have been placed in landscape orientation as depicted in FIG. 4B (Step B56).

Figure 9A:
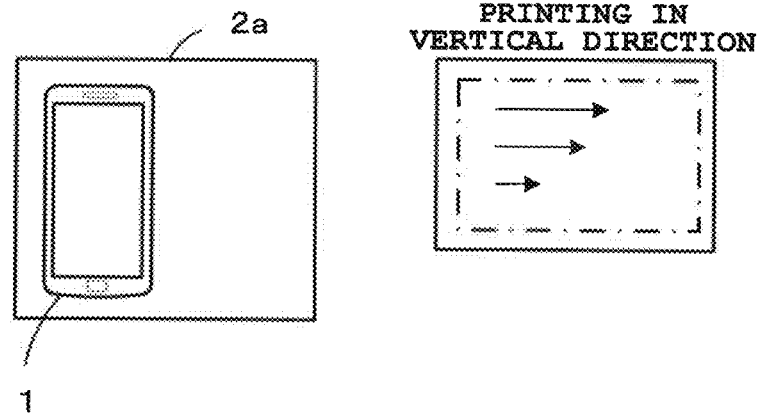
FIG. 9A and FIG. 9B are diagrams for describing the case in which a print format is determined based on the placement state of the portable terminal device 1.
Figure 9B:
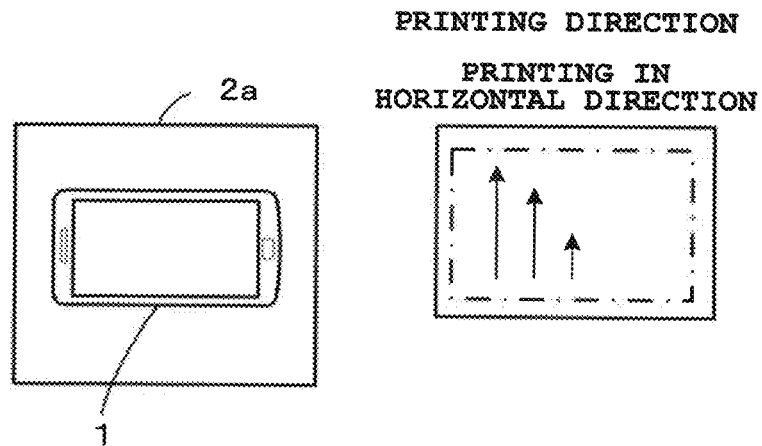

After this placement state determination processing (Step B5 of FIG. 6) ends, the CPU 21 judges whether the result indicates that determination of the placement state is impossible (Step B6). When the result indicates that determination of the placement state is impossible (YES at Step B6), a placement error message is displayed (Step B7) for informing the user that the portable terminal device 1 is not in a predetermined placement state, and then the process returns to the initial Step B1. When the result indicates that determination of the placement state is not impossible (NO at Step B6), a print format is determined based on the determination result (Step B8). FIG. 9A and FIG. 9B are diagrams for describing the case in which a print format is determined based on the placement state of the portable terminal device 1. FIG. 9A depicts a print format when the placement state of the portable terminal device 1 is in portrait orientation. In the case of portrait orientation, printing in the vertical direction is determined as a print format, where printing is performed in a direction orthogonal to a short-side direction of a paper sheet. FIG. 9B depicts a print format when the placement state of the portable terminal device 1 is in landscape orientation. In the case of landscape orientation, printing in the horizontal direction is determined as a print format, where printing is performed in a direction parallel to the short-side direction of the paper sheet.

After the processing for determining a print format according to the placement state of the portable terminal device 1 in the manner described above, the process proceeds to the flow of FIG. 7, requesting the portable terminal device 1 to transmit the print data (Step B9). When the print data is received from the portable terminal device 1 in response to this request (Step B10), the CPU 21 judges whether an instruction for print start has been issued from the portable terminal device 1 (Step B11) and whether an operation for giving an instruction to stop printing has been performed (Step B12). Here, when an instruction for stopping printing is issued from the operation section 24 (Step B12), processing for deleting the print data received from the portable terminal device 1 and the print format determined in the manner described above is performed (Step B15), and then the process returns to Step B1 of FIG. 6.

Also, when an instruction for print start is received from the portable terminal device 1 (YES at Step B11), the printer mechanism section 26 is started. The printer mechanism section 26 starts an operation of printing the print data received from the portable terminal device 1 according to the print format described above (Step B13). In this case, printing in the vertical direction as depicted in FIG. 9A or printing in the horizontal direction as depicted in FIG. 9B is performed according to the print format (printing in the vertical direction or printing in the horizontal direction). Here, when printing ends (YES at Step B14), processing for deleting the print data and the print format is performed (Step B15), and then the process returns to Step B1 of FIG. 6.

In the first embodiment, the placement state of the portable terminal device 1 placed on the copy machine 2 is detected in the manner described above. Then, according to this placement state, a print format is determined. The print data received from the portable terminal device 1 is then printed according to the print format. Thus, desired printing can be easily achieved with intuitive operation such that the portable terminal device 1 is placed on the copy machine 2, and convenience is enhanced.

The copy machine 2 detects the orientation of the portable terminal device 1 placed on the placement surface (placement table) 2a as a placement state. Thus, the user of the copy machine 2 can specify a desired print format only by changing the placement orientation of the portable terminal device 1.

As a placement state, the copy machine 2 detects landscape orientation or portrait orientation as an orientation of the portable terminal device 1, determines a print format indicative of printing in the horizontal direction when the state is in landscape orientation, and determines a print format indicative of printing in the vertical direction when the state is in portrait orientation. Thus, the printing direction and the placement orientation can correspond to each other for easy understanding by the user. In this case, if the portable terminal device 1 is placed on the copy machine 2 with the print target data being displayed on the portable terminal device 1, the user can image an actual state of printing.

Note that, although the light-emitting sections and the light-receiving sections are used as sections for detecting a placement state in the first embodiment described above, the present invention is not limited thereto, and another section may be used as long as it can detect a placement state.

Note that the copy machine 2 in the first embodiment described above detects whether the state is in landscape orientation or portrait orientation as a placement state when the portable terminal device 1 is placed and determines a print format indicative of printing in the horizontal direction when the placement state is in landscape orientation and determines a print format indicative of printing in the vertical direction when the placement state is in portrait orientation. However, as a placement state of the portable terminal device 1, not only the placement orientation but also the position where the portable terminal device 1 is placed can be used.

Furthermore, the copy machine 2 may detect a form when the portable terminal device 1 is placed as depicted in FIG.

Figure 10A:
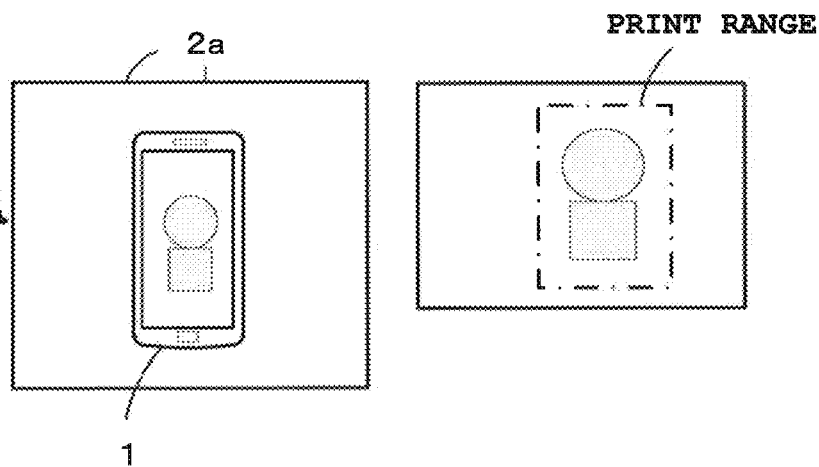
FIG. 10A and FIG. 10B are diagrams for describing application examples of the first embodiment.
Figure 10B:
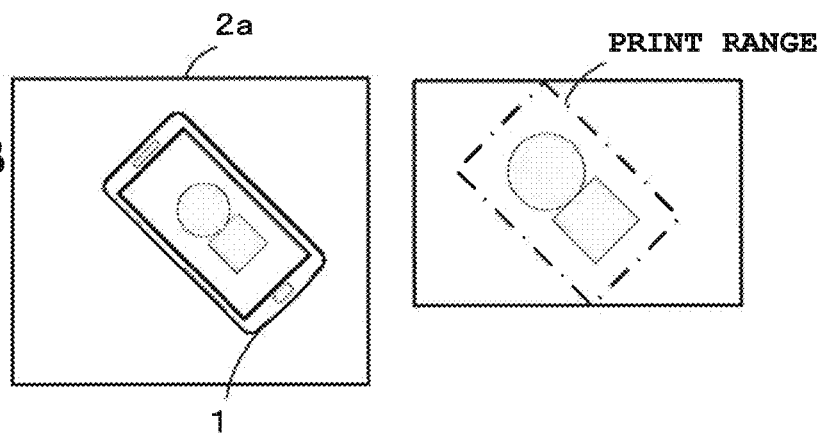

10A and FIG. 10B and determine a print format indicative of a range similar to the form of this portable terminal device 1 as a print range. Note that as a section for detecting a form when the portable terminal device 1 is placed, for example, a touch panel (omitted in the drawing) may be placed on an upper surface of the placement table 2a to detect a form of the portable terminal device 1 from its contact state. Alternatively, an image pickup element (omitted in the drawing) may be placed on a lower side of the placement table 2a to detect a form of the portable terminal device 1 by imaging the portable terminal device 1.

That is, as depicted in FIG. 10A, when the portable terminal device 1 is placed in portrait orientation at the center of the placement table 2a, a print format is determined with a longitudinally-extended area at the center of a paper sheet (an area similar to the form of the portable terminal device 1) as a print range. In FIG. 10B, when the portable terminal device 1 is placed at the center of the placement table 2a with it being inclined at 45 degrees, a print format is determined with a inclined longitudinally-extended area at the center of the paper sheet (an area similar to the form of the portable terminal device 1) as a print range. As such, data can be printed on the paper sheet with the portable terminal device 1 being placed as described above.

Second Embodiment

A second embodiment of the present invention is described below with reference to FIG. 11 and FIG. 12.

Note that the copy machine 2 detects one type (placement orientation) as a placement state of the portable terminal device 1 and determines one print format in the first embodiment described above. In the second embodiment, two types, or in other words, placement orientation and placement position are simultaneously detected as a placement state of the portable terminal device 1, and a print format corresponding to each of the detected plurality of placement states is determined. Here, components basically identical or identical in name between the first and second embodiments are provided with the same reference number and are not described herein. In the following, a characteristic portion of the second embodiment is mainly described.

FIG. 11 is a diagram of a format table FT for describing the second embodiment.

The format table FT is a table having stored therein a print format determined according to the placement state of the portable terminal device 1, and has items "placement state", "printing direction", and "paper size". "Placement state" indicates any of combinations of a placement orientation and a placement position of the portable terminal device 1, that is, "portrait leftward orientation", "portrait center orientation", "portrait rightward orientation", "landscape upward orientation", "landscape center orientation", and "landscape downward orientation". "Printing direction" indicates any one of a "vertical direction" for printing in a direction orthogonal to the short-side direction of the paper sheet and a "horizontal direction" for printing in a direction parallel to the short-side direction of the paper sheet. "Paper size" indicates a size such as B5, A4, or B4 or a photo size such as E, L, or LL.

FIG. 12 is a flowchart for describing placement state determination processing (Step B5 of FIG. 6) in detail in the second embodiment. Note that while the flowcharts of FIG. 5 and FIG. 9 are basically similarly used in the second embodiment, FIG. 8 is replaced by a flowchart of FIG. 12 in the second embodiment.

First, the CPU 21 of the copy machine 2 judges whether all of the light-receiving sections RL1 to RL4 configuring the placement detecting section 27a are in an "OFF" state (Step B501). Here, when all of the light-receiving sections RL1 to RL4 are in an "OFF" state and all rays from the corresponding light-emitting sections EL1 to EL4 are interrupted by the portable terminal device 1 (YES at Step B501), if the light-receiving sections RC1 and RC2 are in an "OFF" state, the light-receiving sections RC3 and RC4 are in an "OFF" state, and the light-receiving sections RC3 and RC4 are in an "ON" state (YES at Step B502), a determination is made as "portrait leftward orientation" (Step B503).

Also, when all of the light-receiving sections RL1 to RL4 are in an "OFF" state (YES at Step B501), the light-receiving sections RC2 and RC3 are in an "OFF" state, and the light-receiving sections RC1 and RC4 are in an "ON" state (YES at Step B504), a determination is made as "portrait center orientation" (Step B505). Furthermore, when all of the light-receiving sections RL1 to RL4 are in an "OFF" state (YES at Step B501), the light-receiving sections RC3 and RC4 are in an "OFF" state, and the light-receiving sections RC1 and RC2 are in an "ON" state (YES at Step B506), a determination is made as "portrait rightward orientation" (Step B507). Note that, if none of the conditions described above applies (NO at Step B506), determination of the placement state is impossible (Step B515), and the process exits the flow of FIG. 12.

On the other hand, if the state is not in portrait orientation (NO at Step B501), the CPU 21 judges whether all of the light-receiving sections RC1 to RC4 are in an "OFF" state (Step B508). Here, when all of the light-receiving sections RC1 to RC4 are in an "OFF" state and all rays from the corresponding light-emitting sections EC1 to EC4 are interrupted by the portable terminal device 1 (YES at Step B508), if the light-receiving sections RL1 and RL2 are in an "OFF" state and the light-receiving sections RL3 and RL4 are in an "ON" state (YES at Step B509), a determination is made as "landscape upward orientation" (Step B510).

Furthermore, when all of the light-receiving sections RC1 to RC4 are in an "OFF" state (YES at Step B508), if the light-receiving sections RL2 and RL3 are in an "OFF" state and the light-receiving sections RL1 and RL4 are in an "ON" state (YES at Step B512), a determination is made as "landscape center orientation" (Step B512). Still further, when all of the light-receiving sections RC1 to RC4 are in an "OFF" state (YES at Step B508), if the light-receiving sections RL3 and RL4 are in an "OFF" state and the light-receiving sections RL1 and RL2 are in an "ON" state (YES at Step B513), a determination is made as "landscape downward orientation" (Step B514). Note that, if none of the conditions described above apply (NO at Step B513), determination of the placement state is impossible (Step B515), and the process exits the flow of FIG. 12.

Based on the placement state of the portable terminal device 1 determined as described above (the combination of the placement orientation and the placement position), the format table FT is referred to, thereby setting a relevant print format. For example, when the placement state of the portable terminal device 1 is in "portrait leftward orientation", the printing direction is in the "vertical direction" and the paper size is "B5 size/E". If the placement state is in "portrait center orientation", the printing direction is in the "vertical direction" and the paper size is "A4 size/L". If the placement state is in "portrait rightward orientation", the printing direction is in the "vertical direction" and the paper size is "B4 size/LL". Also, if the placement state is in "landscape upward orientation", the printing direction is in the "horizontal direction" and the paper size is "B5 size/E". If the placement state is in "landscape center orientation", the printing direction is in the "horizontal direction" and the paper size is "A4 size/L". If the placement state is in "landscape downward orientation", the printing direction is in the "horizontal direction" and the paper size is "B4 size/LL" The print data is printed according to the plurality of print formats determined as described above.

As described above, in the second embodiment, the copy machine 2 detects a plurality of placement states of the portable terminal device 1 simultaneously and determines a print format corresponding to each of the detected plurality of placement states. Thus, only by placing the portable terminal device 1 on the copy machine 2, the plurality of print formats can be determined at one time. Therefore, the user can easily achieve desired printing without performing a complex format setting operation.

As the placement state of the portable terminal device 1, its placement position is detected. Therefore, the user can specify a print format only by changing the placement position.

According to the position of the portable terminal device 1, the print format indicative of a paper size is determined. Therefore, with a position of the portable terminal device 1 and a paper size associated with each other, the paper size can be imaged according to the position.

Figure 13:
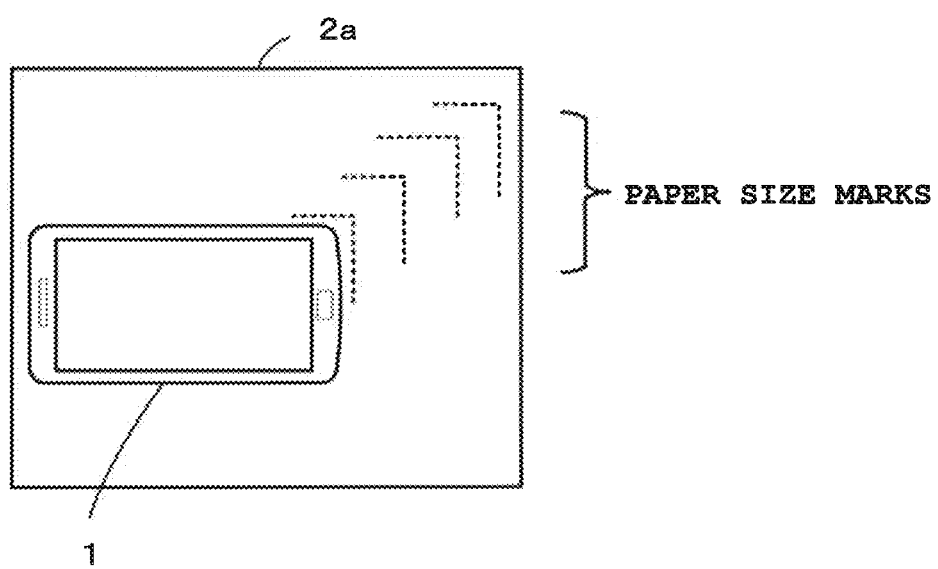
FIG. 13 is a diagram for describing an application example of the second embodiment.

Note that the paper size is specified by changing the position of the portable terminal device 1 in a leftward or rightward direction or in an upward or downward direction in the second embodiment described above. However, as depicted in FIG. 13, the paper size may be specified by forming marks (guides) such as ruled lines at positions of similar figures of the paper size on the placement table 2a and changing the position of the portable terminal device 1 in a slanting direction so as to be along any of these marks (guides).

Also in the second embodiment described above, the printing direction and the paper size are specified based on the placement state (a combination of the placement orientation and the placement position) of the portable terminal device 1. However, the print formats are not restricted to these. For example, as depicted in FIG. 14A to FIG. 14D, multi-printing may be specified. In this case, a placement count of the portable terminal device 1 placed on the placement table 2a of the copy machine 2 may be detected as a placement state, and a print format may be determined based on this placement count. Here, multi-printing may be specified by determining a print format indicative of the number of divisional areas for printing by dividing a paper sheet into a plurality of areas.

For example, FIG. 14A to FIG. 14D are diagrams for describing the case in which multi-printing is specified as a print format according to the placement state of the portable terminal device 1. Note that, in the drawings, (C1) to (C4) each indicate a placement count when the portable terminal device 1 is placed at a plurality of times in order to specify multi-printing, with (C1) indicative of a first time, (C2) indicative of a second time, (C3) indicative of a third time, and (C4) indicative of a fourth time. Also, (P1) to (P4) each indicate a printing count when multi-printing is specified, with (P1) indicative of a first time, (P2) indicative of a second time, (P3) indicative of a third time, and (P4) indicative of a fourth time.

FIG. 14A and FIG. 14B are diagrams when different data (for example, data of different pages) are allocated to left and right areas of a paper sheet for printing. That is, as depicted in FIG. 14A, when the portable terminal device 1 is placed in portrait leftward orientation as a first-time placement (C1), printing onto a left-half area of the paper sheet (P1) is performed. Then, when the portable terminal device 1 is placed in portrait rightward orientation as a second-time placement (C2), printing onto a right-half area of the paper sheet (P2) is performed. Similarly, as depicted in FIG. 14B, when the portable terminal device 1 is placed in portrait rightward orientation as a first-time placement (C1), printing onto a right-half area of the paper sheet (P1) is performed. Then, when the portable terminal device 1 is placed in portrait leftward orientation as a second-time placement (C2), printing onto a left-half area of the paper sheet (P2) is performed.

FIG. 14C is a diagram depicting the case in which different data (for example, data of different pages) are allocated to upper and lower areas of a paper sheet for printing. As depicted in FIG. 14C, when the portable terminal device 1 is placed in landscape upward orientation as a first-time placement (C1), printing onto an upper-half area of the paper sheet (P1) is performed. When the portable terminal device 1 is placed in landscape downward orientation as a second-time placement (C2), printing onto a lower-half area of the paper sheet (P2) is performed. FIG. 14D is a diagram depicting the case in which different data (for example, data of different pages) are allocated to left, right, upper, and lower areas of a paper sheet for printing. When the portable terminal device 1 is placed in landscape upward and leftward orientation as a first-time placement (C1), printing onto an upper-left area of the paper sheet (P1) is performed. When the portable terminal device 1 is placed in landscape upward and rightward orientation as a second-time placement (C2), printing onto an upper-right area of the paper sheet (P2) is performed. When the portable terminal device 1 is placed in landscape downward and leftward orientation as a third-time placement (C3), printing onto a lower-left area of the paper sheet (P3) is performed. When the portable terminal device 1 is placed in landscape downward and rightward orientation as a fourth-time placement (C4), printing onto a lower-right area of the paper sheet (P4) is performed.

As such, the placement count of the portable terminal device 1 placed on the placement table 2a of the copy machine 2 is detected as the placement state, and based on this placement count, a print format indicative of the number of divisional areas for printing by dividing the paper sheet into a plurality of areas is determined. When printing is performed according to this print format, printing is performed for each area while different data is allocated to each of the divisional areas obtained by dividing the paper sheet according to the number of divisional areas. With this, multi-printing can be performed only by placing the portable terminal device 1 at a plurality of number of times.

Third Embodiment

A third embodiment of the present invention is described below with reference to FIG. 15.

Note that the copy machine 2 detects a placement state of the portable terminal device 1 in the first embodiment described above. By contrast, in the third embodiment, a placement state of the portable terminal device 1 is detected by the portable terminal device 1 itself. Here, components basically identical or identical in name between the first and third embodiments are provided with the same reference number and are not described herein. In the following, a characteristic portion of the third embodiment is mainly described.

In the third embodiment, the acceleration sensor 18 is used so that the placement state of the portable terminal device 1 is detected by the portable terminal device 1 itself. This acceleration sensor 18 configures a vibration detecting section of the pedometer function and also an orientation detection section for detecting the orientation of the housing (main body) of the portable terminal device 1. With a long-side direction (vertical direction) of the housing (rectangular parallelepiped) being taken as a Y axis direction, a short-side direction being taken as an X axis direction, and its thickness direction being taken as a Z axis direction, acceleration components in three-axis directions (X, Y, and Z directions) orthogonal to one another are detected. The acceleration sensor 18 is configured to output acceleration data on each axis as vertical direction information and include a geomagnetic sensor, by which horizontal direction information is detected for output. That is, the acceleration sensor 18 is a three-axis acceleration sensor with a geomagnetic sensor and is configured to be able to detect horizontal direction information and vertical direction information as the orientation (direction and inclination) of the housing (main body) of the portable terminal device 1.

Figure 15:
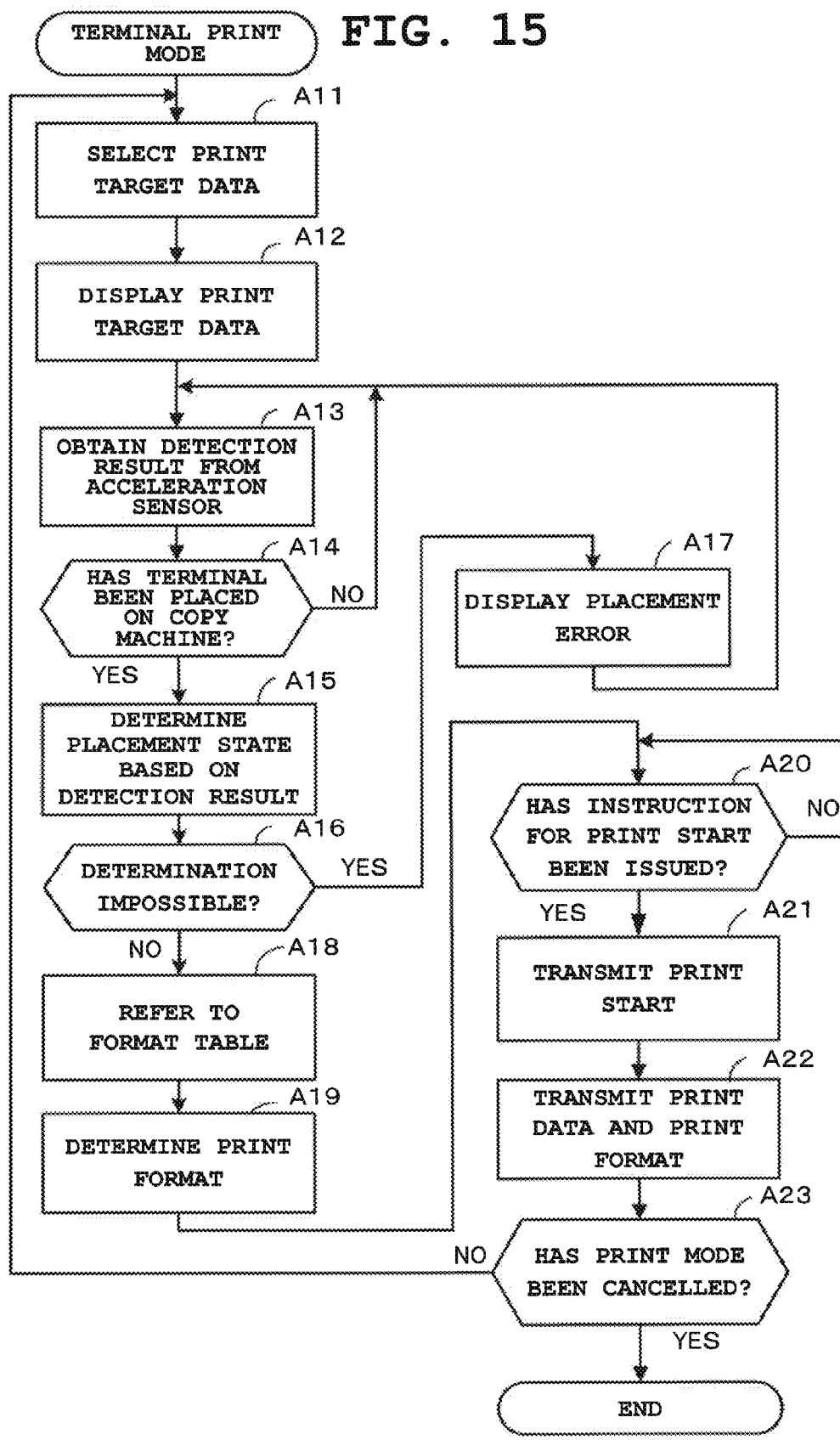
FIG. 15 is a flowchart outlining the operation of a characteristic portion of a third embodiment that is started at the time of switching to a print mode from among all of the operations of the portable terminal device 1.

FIG. 15 is a flowchart outlining the operation of a characteristic portion of the third embodiment that is started at the time of switching to a print mode from among all of the operations of the portable terminal device 1. After exiting the flow in this FIG. 15, the process returns to the main flow (omitted in the drawing) of the entire operation. Here, when using the copy machine 2, the user operates the mode key described above to switch to the print mode. Also, in the state switched to this print mode, after an operation of displaying a data list screen is performed, an operation of selecting any data from the list screen as print target data is performed.

When an operation of selecting any data from the list screen is performed (Step A11), the CPU 11 of the portable terminal device 1 causes the print data to be displayed on the entire screen of the touch input display section 16 (Step A12). Here, the user confirming the print data places the portable terminal device 1 on the placement table 2a of the copy machine 2 in consideration of the orientation of placement according to desired printing. In this case, the portable terminal device 1 is placed so as to be in a substantially horizontal state and so that the touch input display section 16 is oriented upward. The CPU 11 obtains the detection result from the acceleration sensor 18 (Step A13), and examines whether the portable terminal device 1 has been placed on the placement table 2a of the copy machine 2 (Step A14). In this case, after the print data is selected, the CPU 11 identifies whether the portable terminal device 1 is placed in a substantially horizontal state based on vertical direction information from the acceleration sensor 18 and whether the touch input display section 16 is oriented upward. With this, the CPU 11 identifies whether the portable terminal device 1 is correctly placed on the copy machine 2.

Here, when the portable terminal device 1 is in a substantially horizontal state and the touch input display section 16 is placed so as to be facing upward, the CPU 11 determines that the portable terminal device 1 has been correctly placed on the copy machine 2 (YES at Step A14). The process then proceeds to the next Step A15, or in other words, changes to setting state determination processing. In this setting state determination processing, the CPU 11 examines whether the portable terminal device 1 is in portrait orientation, landscape orientation, or other than these based on the detection result (horizontal direction information) of the acceleration sensor 18. Accordingly, the CPU 11 examines whether the portable terminal device 1 is other than in portrait orientation or landscape orientation, or in other words, determination of the placement state is impossible (Step A16). When determination of the placement state is impossible (YES at Step A16), a placement error message is displayed (Step A17) in order to inform the user that the state is not a predetermined placement state, and returns to Step A13 described above.

Also, when the portable terminal device 1 is in portrait orientation or landscape orientation, or in other words, when determination of the placement state is not impossible (NO at Step A16), the format table (omitted in the drawing) is referred to based on the orientation (Step A18) to determine a relevant print format (Step A19). For example, when the placement state of the portable terminal device 1 is in portrait orientation, printing in the vertical direction for printing in a direction orthogonal to the short-side direction of the paper sheet is determined as a print format. When the placement state is in landscape orientation, printing in the horizontal direction for printing in a direction parallel to the short-side direction of the paper sheet is determined as a print format.

Then, the CPU 11 judges whether an operation for making an instruction for print start has been performed (Step A20), and the portable terminal device 1 waits until an instruction for print start is issued. Here, a print start instruction is issued (YES at Step A20), the portable terminal device 1 transmits a print start instruction to the copy machine 2 (Step A21). Then, the print data selected by the user and the print format determined as described above are transmitted to the copy machine 2 (Step A22). Then, the CPU 11 judges whether an operation of cancelling the print mode has been performed (Step A23), and the process returns to Step A11 described above until the print mode is canceled. Thereafter, the operation described above is repeated.

On the other hand, in the copy machine 2, upon reception of the print start instruction from the portable terminal device 1, the printer mechanism section 26 is started and the copy machine 2 enters a wait state. Then, upon reception of the print data and the print format from the portable terminal device 1, the copy machine 2 starts an operation of printing the print data according to the print format.

As described above, in the third embodiment, the portable terminal device 1 detects a placement state on the copy machine 2 by itself and determines a print format according to the placement state, and also transmits the print format and the print data to the copy machine 2. Thus, the copy machine 2 simply receives data from the portable terminal device 1 and prints the data, and printing in cooperation with the portable terminal device 1 can be performed without preparation of a dedicated application or a dedicated device.

The orientation of the main body of the device is detected as a placement state based on the detection result of the acceleration sensor 18. With this, an appropriate detection of the placement state can be made. Also, an acceleration sensor used for another function can be used.

Note that while the acceleration sensor 18 including a geomagnetic sensor is exemplarily described as a section for detecting a placement state in the third embodiment described above, a geomagnetic sensor is not required if the placement table 2a of the copy machine 2 is tilted to form an inclined surface. Also, when the portable terminal device 1 is placed on the copy machine 2, a light-receiving section (omitted in the drawing) that receives rays from the light-emitting sections (omitted in the drawing) in the copy machine 2 may be placed in the portable terminal device 1 and a placement state may be detected according to the light-receiving state. Furthermore, when the portable terminal device 1 is placed on the placement table 2a of the copy machine 2, the touch input display section 16 of the portable terminal device 1 may be placed so as to be oriented to the placement table 2a, thereby detecting a touch state of a projection formed on the placement table 2a as a placement state.

Moreover, the placement table 2a is not necessarily an indispensable component, and the orientation of the portable terminal device 1 when the portable terminal device 1 is brought near the copy machine 2 may be identified as a placement state. Alternatively, the orientation with respect to a certain reference may be identified as a placement state. Still further, the placement table 2a may be provided separately from the printing device.

Furthermore, the portable terminal device 1 may detect a plurality of placement states of different types and determine a print format corresponding to each of the plurality of placement states. With this, only by placing the portable terminal device 1 on the copy machine 2, the plurality of print formats can be determined at one time. Therefore, the user can easily achieve desired printing without performing a complex format setting operation.

Still further, in each of the embodiments described above, the print formats may include not only a printing direction, a print position, and a paper size but also a paper margin, a character size, density, color/monochrome printing, etc. Furthermore, the print format is not meant to be restrictive, and may include print control information such as a print count, whether to perform duplex printing, print start and print stop.

Yet still further, the placement state of the portable terminal device 1 is not restricted to placement orientation, a placement position, and a placement count, but may also include a moving direction or moving amount of the portable terminal device 1, and further include a combination of any two or more of the placement orientation, placement position, placement count, moving direction, and moving amount.

Yet still further, while the present invention is applied to a multifunctional portable phone called a smartphone as the portable terminal device 1 in each of the embodiments described above, this is not meant to be restrictive, and the present invention can be applied to a tablet terminal device, a PDA (Personal Digital Assistant), a digital camera, a music player, etc., and can also be applied to a digital camera itself, as a matter of course.

Yet still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A data printing system including a printing device which receives and prints print data and a portable terminal device which transmits the print data to the printing device, the system comprising:
   a state identifying section which identifies a placement state of the portable terminal device;
   a determining section which determines print control information according to the placement state identified by the state identifying section;
   a receiving section which receives print data from the portable terminal device; and
   a printing section which prints the print data according to the print control information determined by the determining section,
   wherein the state identifying section identifies a position of the portable terminal device placed on a placement surface of the printing device, as the placement state, and
   wherein the determining section determines print control information indicative of a paper size according to the position of the portable terminal device identified as the placement state by the state identifying section.

2. The data printing system according to claim 1, wherein the state identifying section identifies a plurality of placement states of different types, of the portable terminal device,
   wherein the determining section determines print control information corresponding to each of the plurality of placement states identified by the state identifying section, and
   wherein the printing section controls printing of the print data according to the plurality of print control information determined by the determining section.

3. The data printing system according to claim 1, wherein the state identifying section further identifies an orientation of the portable terminal device placed on the placement surface of the printing device as the placement state.

4. The data printing system according to claim 3, wherein the state identifying section identifies whether the portable terminal device placed on the placement surface of the printing device is placed in landscape orientation or portrait orientation, as the placement state, and
   wherein the determining section determines print control information indicative of printing in a horizontal direction when the placement state identified by the state identifying section corresponds to landscape orientation, and print control information indicative of printing in a vertical direction when the placement state corresponds to portrait orientation.

5. The data printing system according to claim 1, wherein the state identifying section further identifies a form of the portable terminal device placed on the placement surface of the printing device, as the placement state.

6. The data printing system according to claim 5, wherein the determining section determines print control information that sets an area similar to the form of the portable terminal device identified as the placement state by the state identifying section, as a print range.

7. A non-transitory computer-readable medium having stored thereon a program that is executable by a computer, the program being executable by the computer to perform functions comprising:
   identifying a placement state of a main body of a device;
   determining print control information according to the identified placement state; and
   transmitting the determined print control information and print data to a printing device,
   wherein identifying the placement state comprises identifying a position of the main body of the device, which is placed on a placement surface of the printing device, as the placement state, and
   wherein determining the print control information comprises determining print control information indicative of a paper size according to the position of the main body of the device identified as the placement state.

8. A data printing system including a printing device which receives and prints print data and a portable terminal device which transmits the print data to the printing device, the system comprising:
   a state identifying section which identifies a placement state of the portable terminal device;
   a determining section which determines print control information according to the placement state identified by the state identifying section;
   a receiving section which receives print data from the portable terminal device; and
   a printing section which prints the print data according to the print control information determined by the determining section, wherein the state identifying section identifies a placement count of the portable terminal device placed on a placement surface of the printing device, as the placement state, wherein the determining section determines print control information indicative of a number of divisional areas for printing by dividing a paper sheet into a plurality of areas, when determining the print control information based on the placement count identified by the state identifying section as the placement state, and wherein the printing section performs printing for each area while allocating different data to each of the areas obtained by dividing the paper sheet according to the number of divisional areas, when printing according to the print control information determined by the determining section.

9. A non-transitory computer-readable medium having stored thereon a program that is executable by a computer, the program being executable by the computer to perform functions comprising:

identifying a placement state of a main body of a device;

determining print control information according to the identified placement state; and transmitting the determined print control information and print data to a printing device, wherein identifying the placement state comprises identifying a placement count of the main body of the device, which is placed on a placement surface of the printing device, as the placement state, wherein determining the print control information comprises determining print control information indicative of number of divisional areas for printing by dividing a paper sheet into a plurality of areas, when the print control information is determined based on the placement count identified as the placement state, so as to instruct the printing device to perform printing for each area while allocating different data to each of the areas obtained by dividing the paper sheet according to the number of divisional areas, when printing according to the determined print control information.

\* \* \* \* \*